(12) United States Patent
Youm

(10) Patent No.: US 6,995,996 B2
(45) Date of Patent: Feb. 7, 2006

(54) POWER SUPPLY AND CONTROL METHOD THEREOF

(75) Inventor: Jang-Hyoun Youm, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 222 days.

(21) Appl. No.: 10/702,545

(22) Filed: Nov. 7, 2003

(65) Prior Publication Data

US 2004/0156221 A1     Aug. 12, 2004

(30) Foreign Application Priority Data

Feb. 7, 2003     (KR) ...................... 10-2003-0007872

(51) Int. Cl.
   *H02M 3/24*     (2006.01)
   *H02M 7/5387*   (2006.01)

(52) U.S. Cl. ........................................ 363/98; 363/132

(58) Field of Classification Search .................. 363/16, 363/17, 97, 98, 131, 132
   See application file for complete search history.

(56) References Cited

U.S. PATENT DOCUMENTS

| | | | |
|---|---|---|---|
| 5,146,400 A * | 9/1992 | von der Broeck | 363/98 |
| 5,912,813 A * | 6/1999 | Kerkman et al. | 363/98 |
| 6,087,799 A | 7/2000 | Turner | |
| 6,483,280 B2 | 11/2002 | La Barbera et al. | |
| 6,556,464 B2 * | 4/2003 | Sakai et al. | 363/132 |
| 6,842,354 B1 * | 1/2005 | Tallam et al. | 363/98 |

FOREIGN PATENT DOCUMENTS

| | | |
|---|---|---|
| KR | 10-261193 | 9/1992 |
| KR | 1995-13007 | 5/1995 |
| KR | 10-171178 | 8/1997 |
| KR | 10-296290 | 1/2000 |

* cited by examiner

*Primary Examiner*—Matthew V. Nguyen
(74) *Attorney, Agent, or Firm*—Staas & Halsey LLP

(57) ABSTRACT

A power supply having a rectifying circuit rectifying AC power; an inverting part inverting the power rectified and supplying the inverted AC power to a load, and including first and second bridges connected to ends of the rectifying circuit and having respective pairs of switching units serially connected to each other, comprising: a control voltage signal generating part outputting a control voltage signal having values corresponding to positive and negative values to control the AC power supplied from the inverting part to the load; a switching controller controlling, when the control voltage signal is determined to correspond to positive values, one of the switching units of the first bridge to turn off and a remaining one of the switching units thereof to turn on, and controlling the switching units of the second bridge to alternately turn on and turn off corresponding to which one of an absolute value of the control voltage signal and of a predetermined comparison voltage signal is greater.

36 Claims, 9 Drawing Sheets

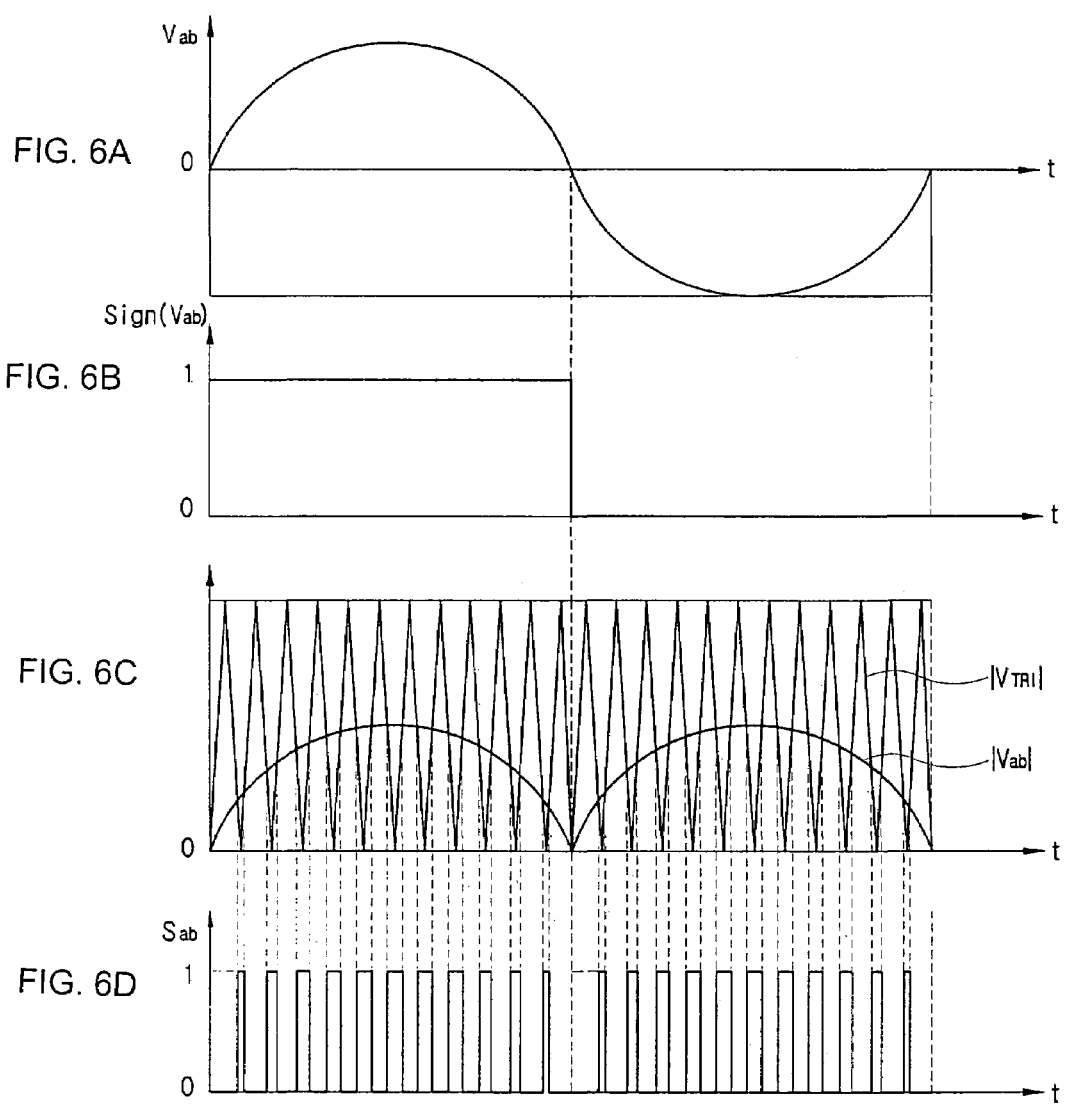

FIG. 8

| SWITCHING CONTROL SIGNAL | LOGICAL EXPRESSION |
|---|---|
| AP | $\text{Sign}(V_{ab})' + S_{abP}$ |
| BP | $\text{Sign}(V_{ab}) + S_{abP}$ |
| AN | $\text{Sign}(V_{ab}) \cdot S_{abN}$ |
| BN | $\text{Sign}(V_{ab})' \cdot S_{abN}$ |

POWER SUPPLY AND CONTROL METHOD THEREOF

CROSS-REFERENCE TO RELATED APPLICATION

This application claims the benefit of Korean Patent Application No. 2003-7872, filed Feb. 7, 2003, in the Korean Intellectual Property Office, the disclosure of which is incorporated herein by reference.

BACKGROUND OF THE INVENTION

1. Field of the Invention

The present invention relates to a power supply and a control method thereof, and more particularly to a power supply and a control method thereof for reducing the number of switching times of a switching unit of an inverting part.

2. Description of the Related Art

FIG. 1 is a view illustrating a circuit of a conventional power supply for supplying AC power to a load 1. As shown in FIG. 1, the power supply comprises a rectifying circuit (not shown) to rectify a commercial AC power (110V/220V) to DC power, an inverting part 3 receiving the DC power rectified by the rectifying circuit, inverting the DC power to AC power having various frequencies and supplying the AC power to the load 1, such as a motor, and a switching controller 500 controlling switching units 11a, 11b, 21a and 21b of the inverting part 3 to open and to close.

The rectifying circuit generally comprises a diode rectifying circuit (not shown) rectifying the commercial AC power into DC power, and a capacitor (not shown) smoothing the DC power rectified by the diode rectifying circuit and transmitting the smoothed and rectified DC power to the inverting part 3.

The inverting part 3, which is connected to two ends of the rectifying circuit, receives the DC power rectified and smoothed by the rectifying circuit, then inverts the DC power to the AC power having the various frequencies and supplies the AC power having the various frequencies to the load 1.

The inverting part 3 comprises a full bridge circuit having a first bridge 10 and a second bridge 20 provided with respective pairs of switching units 11a and 11b, and 21a and 21b serially connected to each other. Diodes 13a, 13b, 23a and 23b, are respectively, connected to opposite ends of the switching units 11a, 11b, 21a and 21b of the first bridge 10 and the second bridge 20, the first bridge 10 and the second bridge 20 being in parallel. Tap nodes 14 and 24 between the respective pairs of switching units 11a and 11b, and 21a and 21b of the first bridge 10 and the second bridge 20 are connected to opposite ends of the load 1 and allow the AC power to be supplied to the load 1 by opening and closing of each of the switching units 11a, 11b, 21a and 21b.

Transistors are used as the respective switching units 11a, 11b, 21a and 21b of the first bridge 10 and the second bridge 20. Gate ends of the transistors 11a, 11b, 21a and 21b are, respectively, connected to switching drivers 12a, 12b, 22a and 22b. The respective switching drivers 12a, 12b, 22a and 22b turn on and turn off the switching units 11a, 11b, 21a and 21b by transmitting voltages corresponding to logical values of switching control signals (AP, BP, AN and BN) outputted from the switching controller 500 to the gate ends of the transistors 11a, 11b, 21a and 21b.

FIG. 2 illustrates an internal configuration of the conventional switching controller 500. As shown in FIG. 2, the switching controller 500 comprises a comparison signal generating part 132 outputting a voltage compared signal S by comparing a control voltage signal $V_{ab}$ transmitted from a control voltage signal generating part 140 with a comparison voltage signal $V_{TRI}$ transmitted from a comparison voltage signal generating part 150, a dead time generating part 134 allowing the voltage compared signal S to change and outputting a first switching signal SN and a second switching signal SP having dead times between each other. Further, the control voltage signal $V_{ab}$ outputted by the control voltage signal generating part 140 is a control signal to control electric power outputted to the load 1 through the inverting part 3, and is a sinusoidal waveform (refer to FIGS. 3A and 3B). Also, the comparison voltage signal $V_{TRI}$ outputted from the comparison voltage signal generating part 150 is a chopping waveform having a predetermined size and a predetermined period (refer to FIGS. 3A and 3B).

The comparison signal generating part 132 compares the control voltage signal $V_{ab}$ of the control voltage signal generating part 140 with the comparison voltage signal $V_{TRI}$ of the comparison voltage signal generating part 150. The comparison signal generating part 132 outputs a voltage compared signal S having a first logical value "1" when a magnitude of the control voltage signal $V_{ab}$ is greater than that of the comparison voltage signal $V_{TRI}$, and outputs a voltage compared signal S having a second logical value "0" when the magnitude of the control voltage signal $V_{ab}$ is smaller than that of the comparison voltage signal $V_{TRI}$.

The dead time generating part 134 changes the voltage compared signal S outputted from the comparison signal generating part 132 to the first switching signal SN and the second switching signal SP having the dead time between each other and outputs the first and second switching signals SN and SP. The dead time generating part 134 provides the first switching signal SN and the second switching signal SP having logical values opposite to each other. Further, a waveform of the first switching signal SN is an identical waveform to that of the voltage-compared signal S. Further, dead times are non-operating times set up to prevent a short circuit, which occurs when the switching units 11a, 11b, 21a and 21b of the first bridge 10 and the second bridge 20 are coincidently turned on.

The first switching signal SN outputted from the dead time generating part 134 is outputted as the switching control signals BP and AN of an upper arm switching unit 11a of the first bridge 10 and a lower arm switching unit 21b of the second bridge 20. The second switching signal SP outputted from the dead time generating part 134 is outputted as the switching control signals AP and BN of an upper arm switching unit 21a of the second bridge 20 and a lower arm switching unit 11b of the first bridge 10.

The switching control signals AP, BP, AN and BN outputted from the switching controller 500 are transmitted to the switching drivers 12a, 12b, 22a and 22b of the respective switching units 11a, 11b, 21a and 21b. The respective switching drivers 12a, 12b, 22a and 22b turn on and turn off the respective switching units 11a, 11b, 21a and 21b by applying voltages to the respective switching units 11a, 11b, 21a and 21b according to the inputted switching control signals AP, BP, AN and BN. Further, the lower arm switching unit 11b of the first bridge 10 and the upper arm switching unit 21a of the second bridge 20 are coincidently turned on by the switching control signals AP, BP, AN and BN. When the lower arm switching unit 11b of the first bridge 10 and the upper arm switching unit 21a of the second bridge 20 are coincidently turned on, the upper arm switching unit 11a of the first bridge 10 and the lower arm switching unit 21b of the second bridge 20 are coincidently turned off.

In a control method of the switching units 11a, 11b, 21a and 21b by the conventional switching controller 500, to supply AC power to the load 1, the respective switching units 11a, 11b, 21a and 21b of the first bridge 10 and the second bridge 20 are turned on and turned off corresponding to a waveform of the voltage compared signal S shown in FIG. 3B, such that switching operations are frequent, thereby causing a power loss.

Further, to remove heat generated due to frequent switching of the respective switching units 11a, 11b, 21a and 21b, a size of a heat sink is increased. Accordingly, cost of a power supply is increased.

SUMMARY OF THE INVENTION

Accordingly, it is an aspect of the present invention to provide a power supply to reduce a number of switching times of switching units of an inverting part.

Additional aspects and/or advantages of the invention will be set forth in part in the description which follows and, in part, will be obvious from the description, or may be learned by practice of the invention.

The above and/or other aspects are achieved by providing a power supply having a rectifying circuit rectifying a commercial AC power; an inverting part inverting the power rectified by the rectifying circuit to AC power and supplying the AC power to a load, and including a first bridge and a second bridge connected, in parallel, to opposite ends of the rectifying circuit and having respective pairs of switching units serially connected to each other, comprising: a control voltage signal generating part outputting a control voltage signal alternating positive and negative values to control the AC power supplied from the inverting part to the load; a switching controller determining a sign of the control voltage signal, controlling, when the control voltage signal is determined to be the positive value, one of the switching units of the first bridge to turn off and a remaining one of the switching units of the first bridge to turn on, and controlling the switching units of the second bridge to alternately turn on and turn off corresponding to which one of an absolute value of the control voltage signal and an absolute value of a predetermined comparison voltage signal is greater.

In an aspect, the switching controller controls, when the control voltage signal is determined to be a negative value, one of the switching units of the second bridge is off and the remaining one of the switching units of the second bridge is on, and the switching units of the first bridge to alternately turn on and turn off corresponding to which one of the absolute value of the control voltage signal and the absolute value of the predetermined comparison voltage signal is greater.

In an aspect, the switching controller comprises a comparison signal generating part outputting a voltage compared signal having a logical value corresponding to a determination result by determining which one of absolute values of the control voltage signal and the comparison voltage signal is greater; a sign signal generating part outputting a control voltage sign signal having a logical value corresponding to positive and negative signs of the control voltage signal; and a switching control signal generating part logically calculating the voltage compared signal and the control voltage sign signal and outputting switching control signals to turn on and turn off the respective switching units of the first bridge and the second bridge.

In an aspect, the switching control signal generating part comprises: a dead time generating part receiving the voltage compared signal and outputting a first switching signal and a second switching signal having a dead time relative to the voltage compared signal; and a logical operation circuit part logically calculating the control voltage sign signal, the first switching signal and the second switching signal and outputting the switching control signals.

In an aspect, the first switching signal and the second switching signal outputted from the dead time generating part have logical values opposite to each other.

In an aspect, the sign signal generating part outputs a control voltage sign signal having a logical value "1" when the control voltage signal is a positive value, and outputs a control voltage sign signal having a logical value "0" when the control voltage signal is a negative value.

In an aspect, the respective switching units of the first bridge and the second bridge are, respectively, divided into an upper arm switching unit connected to a output voltage end of the rectifying circuit and a lower arm switching unit connected to an input voltage end of the rectifying circuit, and the logical operation circuit part outputs the switching control signals allowing the lower arm switching unit of the first bridge to turn on, the upper arm switching unit of the first bridge to turn off, the upper arm switching unit of the second bridge to turn on and turn off corresponding to the first switching signal, and the lower arm switching unit of the second bridge to turn on and turn off corresponding to the second switching signal, while the control voltage sign signal has the logical value "1".

In an aspect, the logical operation circuit part outputs the switching control signals allowing the lower arm switching unit of the second bridge to turn on, the upper arm switching unit of the second bridge to turn off, the upper arm switching unit of the first bridge to turn on and turn off corresponding to the first switching signal, and the lower arm switching unit of the first bridge to turn on and turn off corresponding to the second switching signal, while the control voltage sign signal has the logical value "0".

The above and/or other aspects are achieved by providing a control method of a power supply having a rectifying circuit rectifying a commercial AC power; an inverting part inverting the power rectified by the rectifying circuit to AC power and supplying the AC power to a load, and including a first bridge and a second bridge connected to opposite ends of the rectifying circuit and having respective pairs of switching units serially connected to each other, comprising: generating a control voltage signal alternating and having a negative value and a positive value to control the AC power supplied from the inverting part to the load; determining whether the control voltage signal is a positive value or a negative value; outputting a voltage compared signal having a logical value corresponding to which one of absolute values of the control voltage signal and the voltage compared signal is greater; and controlling one of the switching units of the first bridge to turn on, a remaining one of the switching units of the first bridge to turn off, and the switching units of the second bridge to alternately turn on and turn off corresponding to the voltage compared signal when the control voltage signal is determined to be the positive value.

In an aspect, the control method of the power supply further comprises controlling one of the switching units of the second bridge to turn off, the remaining one of the switching units of the second bridge to turn on, and the switching units of the first bridge to alternately turn on and turn off corresponding to the voltage compared signal when the control voltage signal is determined to be the negative value.

BRIEF DESCRIPTION OF THE DRAWINGS

These and/or other aspects and advantages of the present invention will become apparent and more readily appreciated from the following description of the embodiments, taken in conjunction with the accompany drawings of which:

FIGS. 6A to 6D and 7A to 7G are views illustrating waveforms of respective signals of a control method of a power supply according to the embodiment of the present invention; and FIG. 8 is a table for logical expressions of switching control signals of the power supply according to the embodiment of the present invention.

DETAILED DESCRIPTION OF THE PREFERRED EMBODIMENT

Figure 1:
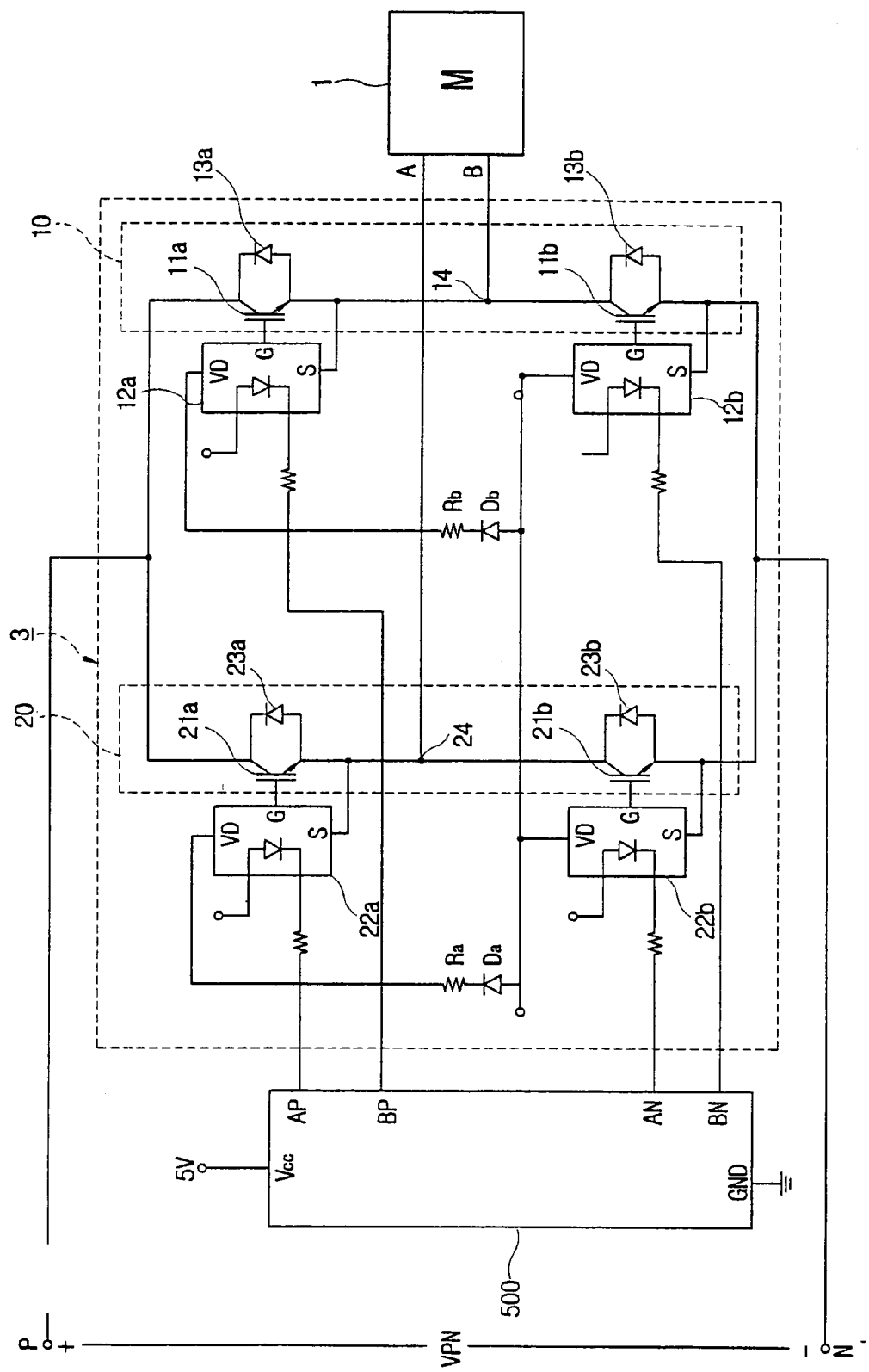
FIG. 1 is a view illustrating a circuit of a general power supply.
Figure 2:
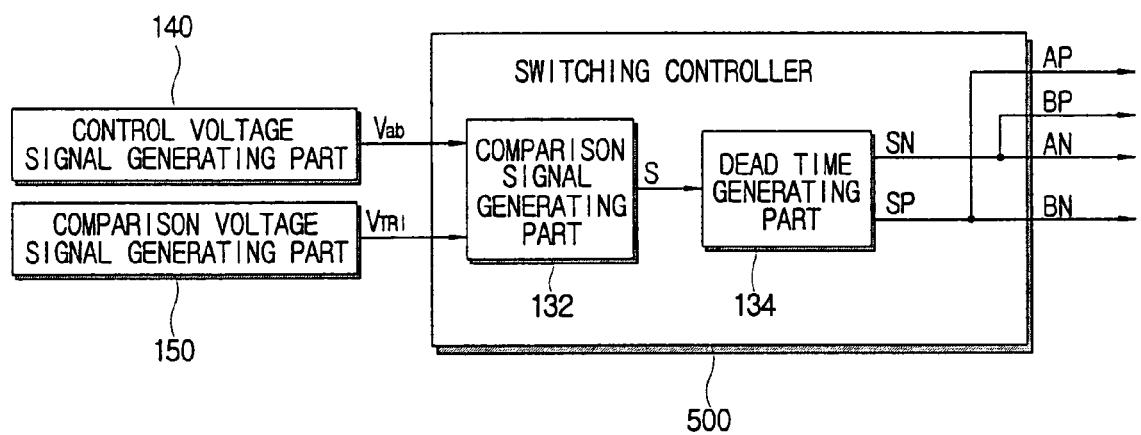
FIG. 2 is a control block diagram of a conventional switching controller.
Figures 3A, 3B:
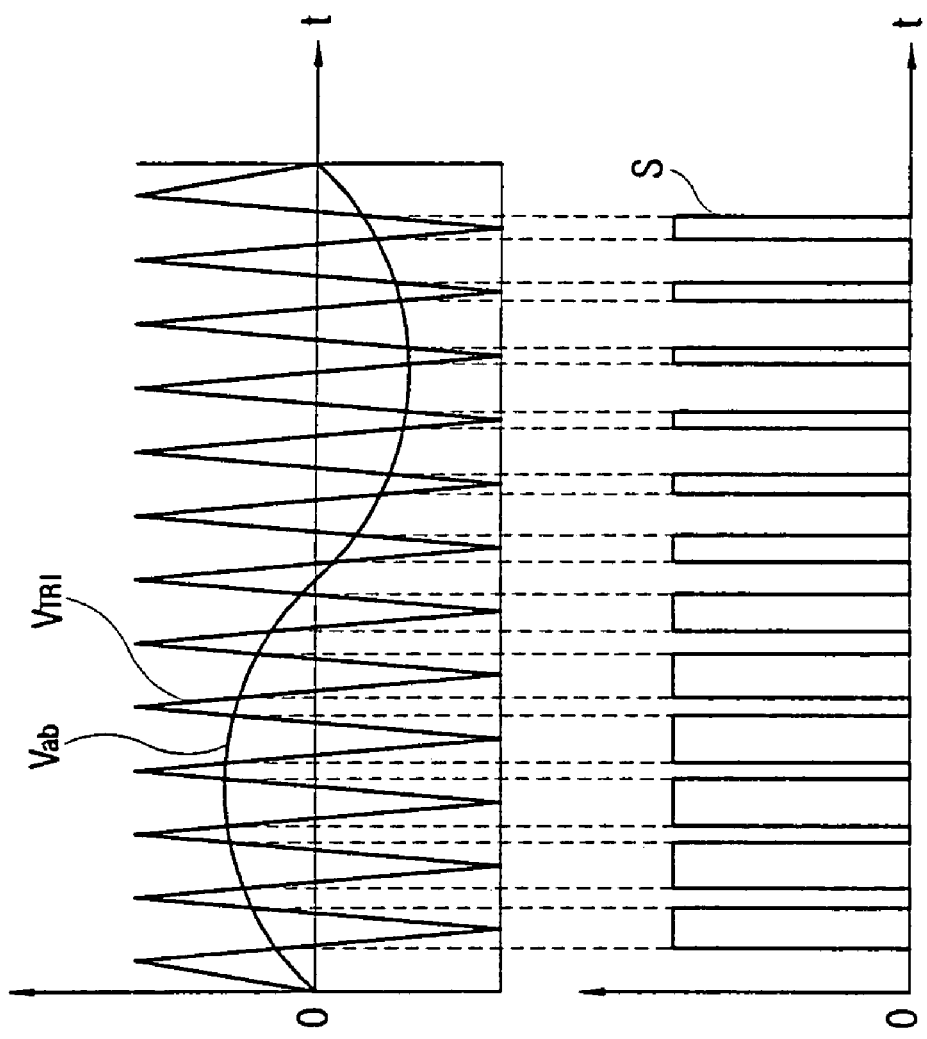
FIGS. 3A and 3B are views illustrating waveforms of respective signals according to a control method of a conventional power supply.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 4A:
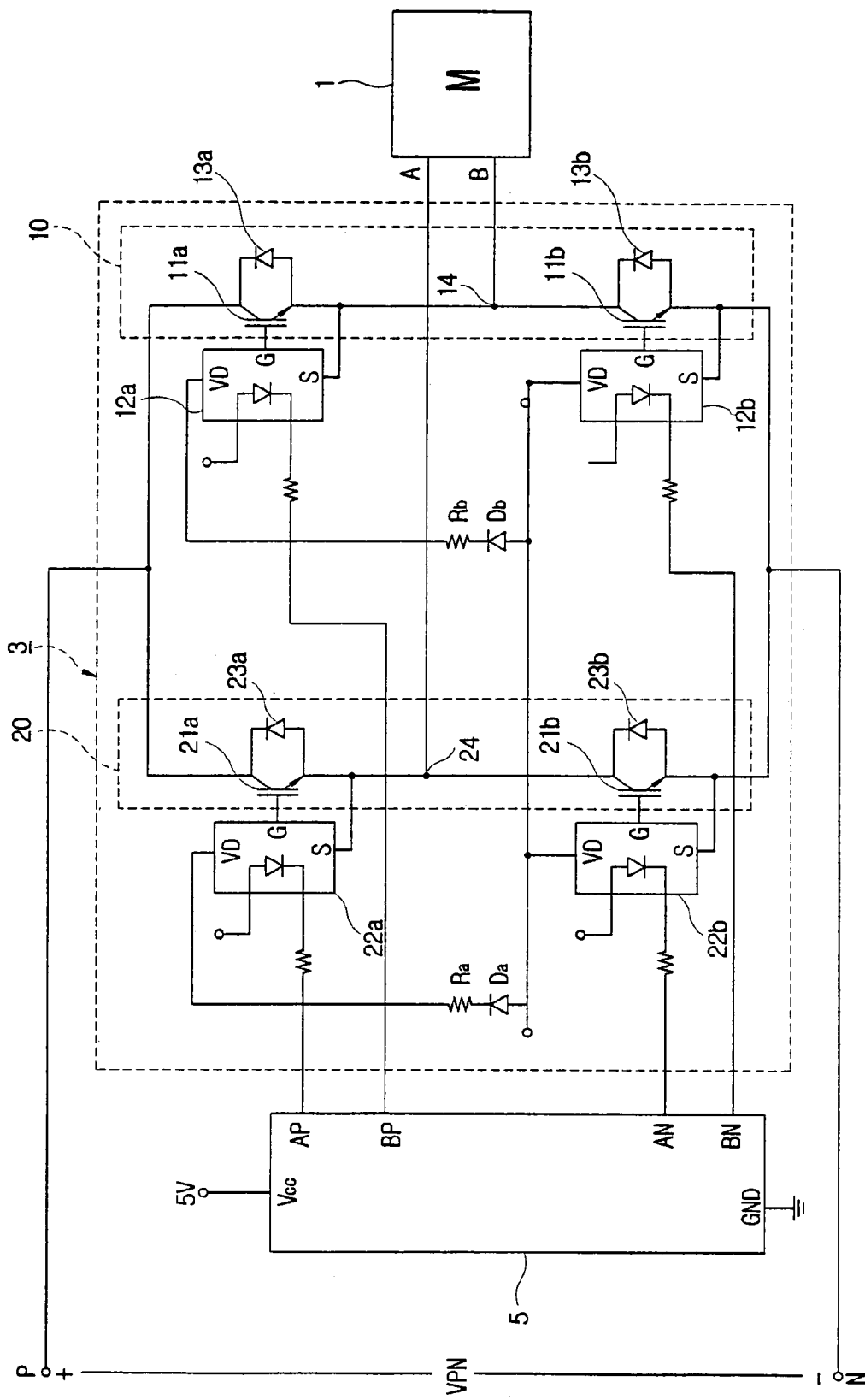
FIG. 4A is a view illustrating a circuit of a power supply according to an embodiment of the present invention.
Figure 4B:
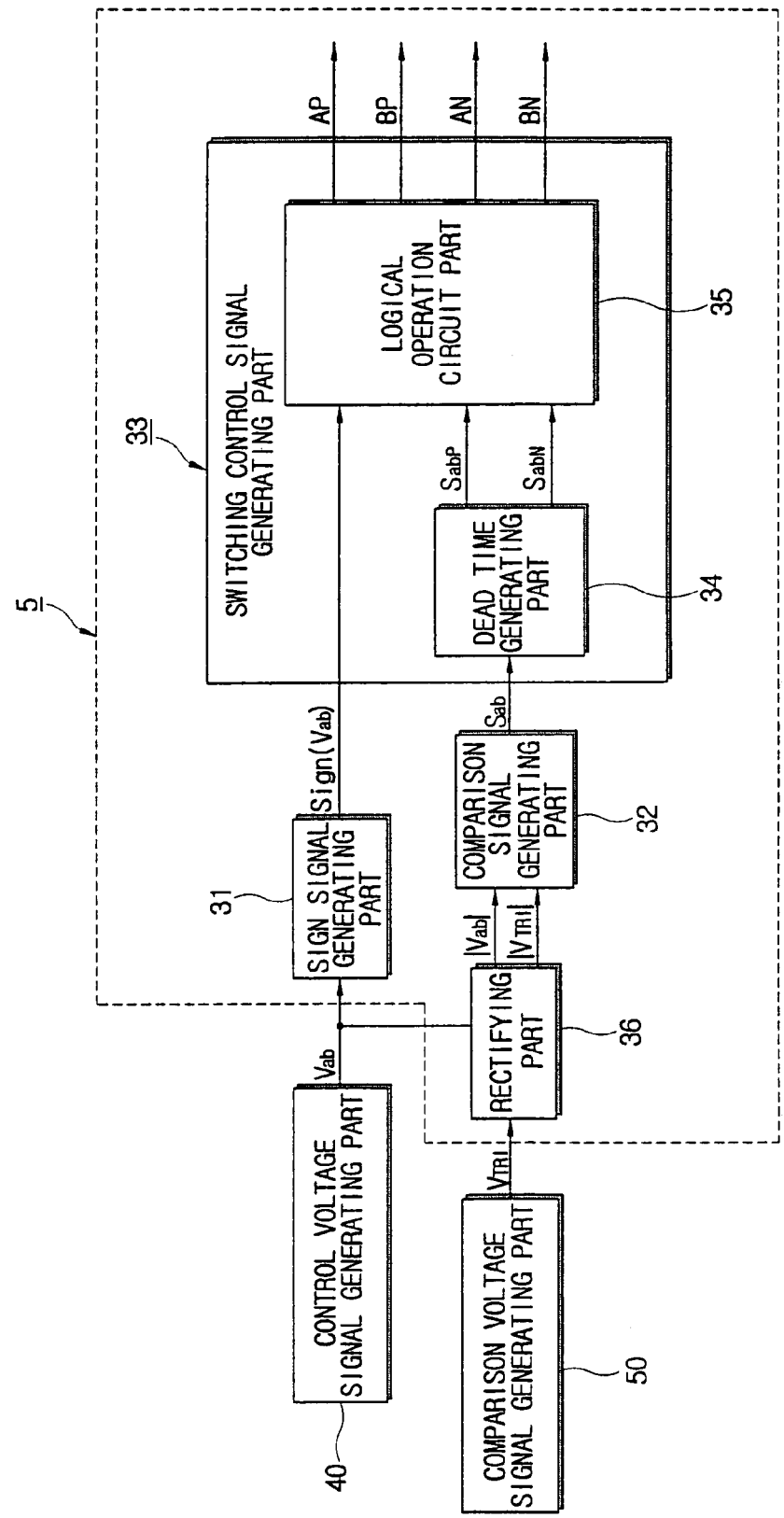
FIG. 4B is a control block diagram of a switching controller according to the embodiment of the present invention.

A power supply according to an embodiment of the present invention, as shown in FIGS. 4A and 4B, comprises a rectifying circuit (not shown) rectifying a commercial AC power into DC power; an inverting part 3 receiving the DC power rectified by the rectifying circuit, inverting the DC power to AC power having various frequencies and supplying the AC power having the various frequencies to a load 1, such as a motor; and a switching controller 5 (refer to FIGS. 4A and 4B) controlling switching units 11a, 11b, 21a and 21b of the inverting part 3 to open and to close.

The inverting part 3, which is connected to opposite ends of the rectifying circuit, inverts the DC power rectified by the rectifying circuit to the AC power having the various frequencies and supplies the AC power to the load 1.

The inverting part 3 comprises a first bridge 10 and a second bridge 20 having respective pairs of the switching units 11a and 11b; and 21a and 21b serially connected to each other. Diodes 13a, 13b, 23a and 23b are, respectively, connected to opposite ends of the switching units 11a, 11b, 21a and 21b of the first bridge 10 and of the second bridge 20 in parallel.

Transistors are used as the respective switching units 11a, 11b, 21a and 21b of the first bridge 10 and the second bridge 20. Gate ends of the transistors (i.e., switching units) 11a, 11b, 21a and 21b are connected to switching drivers 12a, 12b, 22a and 22b. The respective switching drivers 12a, 12b, 22a and 22b turn on and turn off the switching units 11a, 11b, 21a and 21b by transmitting voltages corresponding to logical values of switching control signals AP, BP, AN and BN outputted from the switching controller 5 to the gate ends of the transistors 11a, 11b, 21a and 21b.

Hereinafter, the switching units 11a and 21a of the first bridge 10 and of the second bridge 20, respectively, connected to a voltage output end P of the rectifying circuit are defined as upper arm switching units, and the switching units 11b and 21b of the first bridge 10 and of the second bridge 20, respectively, connected to a voltage input end N of the rectifying circuit are defined as lower arm switching units.

A first tap node 14 between the upper arm switching unit 11a and the lower arm switching unit 11b of the first bridge 10, and a second tap node 24 between the upper arm switching unit 21a and the lower arm switching unit 21b of the second bridge 20 are connected to respective ends of the load 1. When the respective switching units 11a, 11b, 21a and 21b are turned on and turned off, the AC power is supplied to the load 1 through the first and second tap nodes 14 and 24.

The switching controller 5 determines whether a control voltage signal $V_{ab}$ outputted from a control voltage signal generating part 40 is a positive voltage or a negative voltage. Further, when the control voltage signal $V_{ab}$ is determined to be the positive voltage, the switching controller 5 controls one of the upper arm switching unit 11a and the lower arm switching unit 11b of the first bridge 10 to turn off, and a remaining one of the upper arm switching unit 11a and the lower arm switching unit 11b of the first bridge 10 to turn on, and controls the upper arm switching unit 21a and the lower arm switching unit 21b of the second bridge 20 to alternately turn on and turn off according to which one of absolute values of the control voltage signal $V_{ab}$ outputted from the control voltage signal generating part and a comparison voltage signal $V_{TRI}$ outputted from a comparison voltage signal generating part 50 is greater.

Further, when the control voltage signal $V_{ab}$ is determined to be a negative voltage, the switching controller 5 controls one of the upper arm switching unit 21a and the lower arm switching unit 21b of the second bridge 20 to turn off, and the remaining one of the upper arm switching unit 21a and the lower arm switching unit 21b of the second bridge 20 to turn on, and controls the upper arm switching unit 11a and the lower arm switching unit 11b of the first bridge 10 to alternately turn on and turn off according to which one of the absolute values of the control voltage signal $V_{ab}$ and the comparison voltage signal $V_{TRI}$ is greater.

Further, the control voltage signal $V_{ab}$ outputted from the control voltage signal generating part 40 is a control signal to control the AC power supplied from the inverting part 3 to the load 1, which may be a sine waveform alternating having positive and negative signs may be an AC power of a predetermined voltage. Further, the comparison voltage signal $V_{TRI}$ outputted from the comparison voltage signal generating part 50 may be a chopping waveform (refer to FIGS. 6A and 6D) and may be an AC power of a predetermined voltage.

Hereinafter, an embodiment of a power supply according to the present invention will be described with reference to FIGS. 4A through 8.

The switching controller 5 comprises a comparison signal generating part 32 outputting a voltage compared signal $S_{ab}$ having a logical value corresponding to a determination result by determining which one of absolute values of the control voltage signal $V_{ab}$ and of the comparison voltage signal $V_{TRI}$ is greater, a sign signal generating part 31 outputting a control voltage sign signal Sign($V_{ab}$) having a logical value corresponding to positive and negative signs of the control voltage signal $V_{ab}$, and a switching control signal generating part 33 outputting the switching control signals AP, BP, AN and BN to turn on and turn off the respective switching units 11a, 11b, 21a and 21b of the first bridge 10 and of the second bridge 20 by logically calculating the voltage compared signal $S_{ab}$ and the control voltage sign signal Sign($V_{ab}$).

The comparison signal generating part 32 compares the magnitudes of the control voltage signal $V_{ab}$ outputted from the control voltage signal generating part 40 and of the comparison voltage signal $V_{TRI}$ outputted from the comparison voltage signal generating part 50. Further, the comparison signal generating part 32 is provided to output the voltage compared signal $S_{ab}$ by comparing the magnitudes of absolute values of the control voltage signal $V_{ab}$ and the comparison voltage signal $V_{TRI}$. Herein, a rectifying part 36 may be provided in the switching controller 5, so that the control voltage signal $V_{ab}$ and the comparison voltage signal $V_{TRI}$ outputted from the control voltage signal generating part 40 and the comparison voltage signal generating part 50 may be rectified to have a waveform shown in FIG. 6C and may be inputted to the comparison signal generating part 32.

The comparison signal generating part 32 outputs a voltage compared signal $S_{ab}$ having a logical value "1" when the absolute value of the inputted control voltage signal $V_{ab}$ is greater than that of the comparison voltage signal $V_{TRI}$, and outputs a voltage compared signal $S_{ab}$ having a logical value "0" when the absolute value of the inputted control voltage signal $V_{ab}$ is smaller than that of the comparison voltage signal $V_{TRI}$.

The sign signal generating part 31 determines whether the control voltage signal $V_{ab}$ outputted from the control voltage signal generating part 40 is the positive value or the negative value. Further, the sign signal generating part 31 outputs a control voltage sign signal Sign($V_{ab}$) having a logical value "1" when the control voltage signal $V_{ab}$ is the positive value, and outputs a control voltage sign signal Sign($V_{ab}$) having a logical value "0" when the control voltage signal $V_{ab}$ is the negative value.

The switching control signal generating part 33 comprises a dead time generating part 34 receiving the voltage compared signal $S_{ab}$ and outputting a first switching signal $S_{abP}$ and a second switching signal $S_{abN}$ having dead times, and a logical operation circuit part 35 logically calculating the voltage sign signal Sign($V_{ab}$), the first switching signal $S_{abP}$ and the second switching signal $S_{abN}$, and outputting the switching control signals AP, BP, AN and BN.

Figure 5:
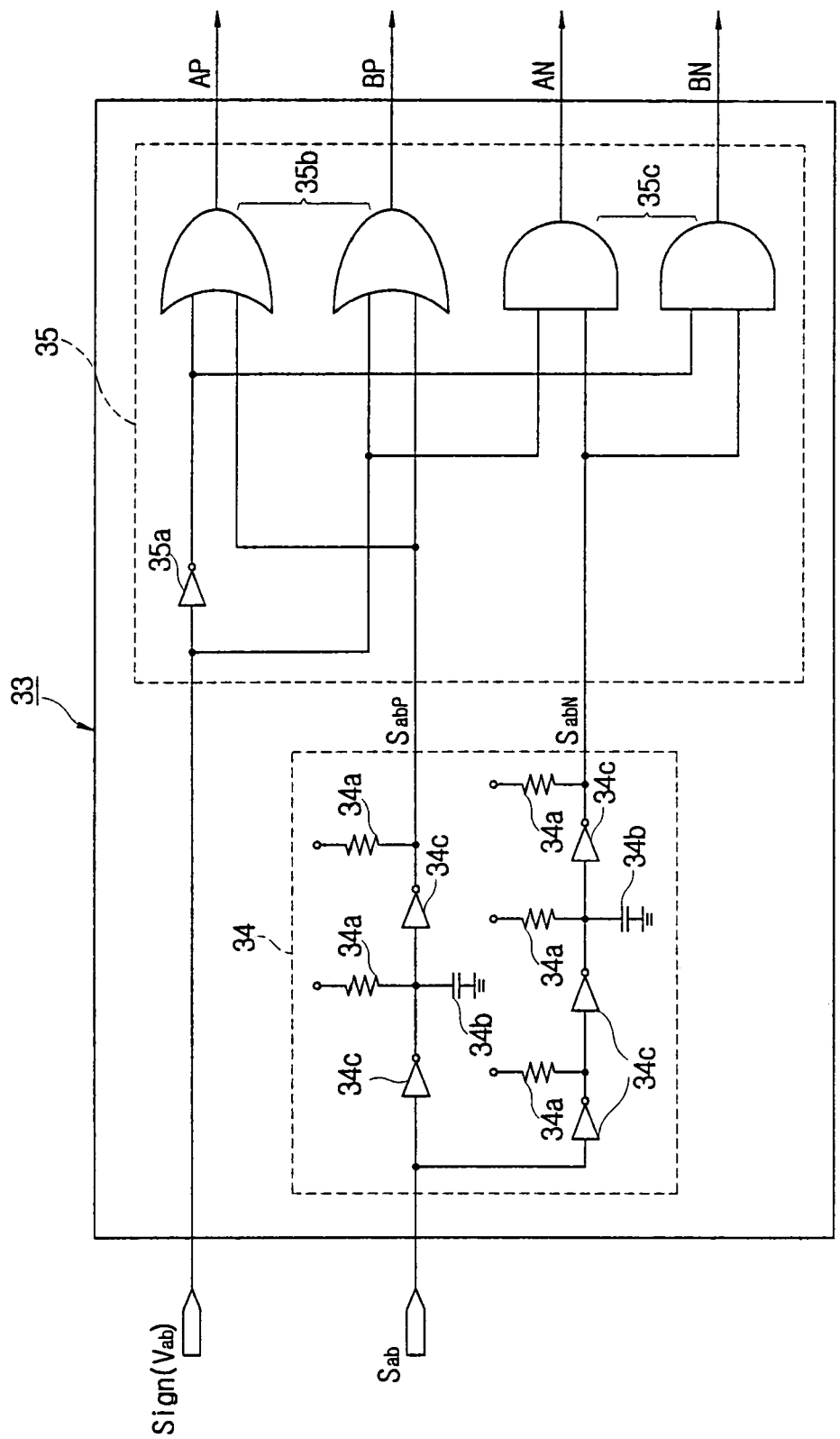
FIG. 5 is a view illustrating a logic circuit according to the embodiment of a switching control signal generating part of the switching controller in FIG. 4B.
Figure 7A:
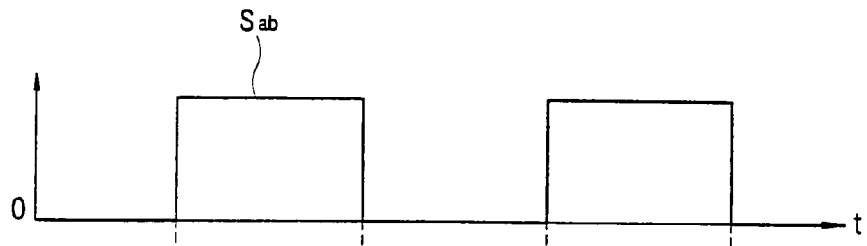
Figure 7B:
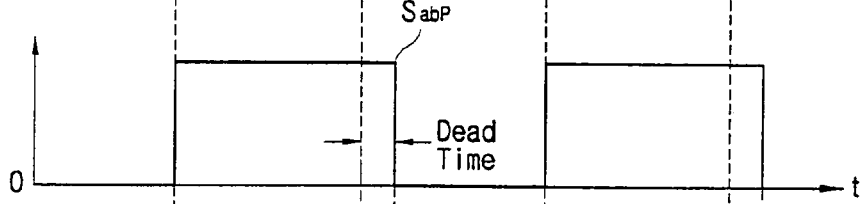
Figure 7C:
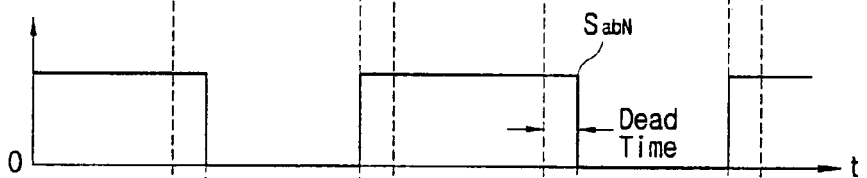
Figure 7D:
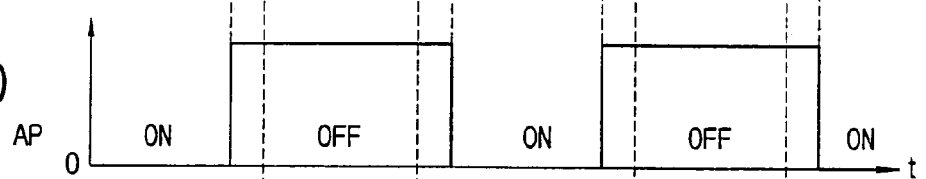
Figure 7E:
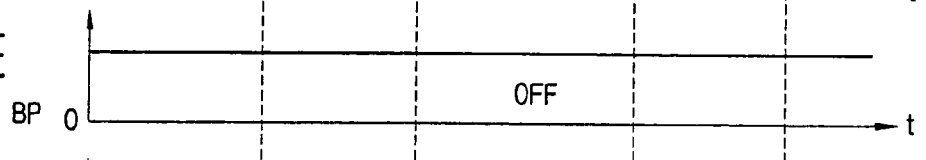
Figure 7F:
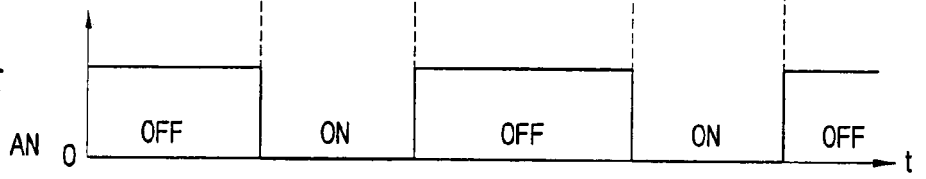
Figure 7G:
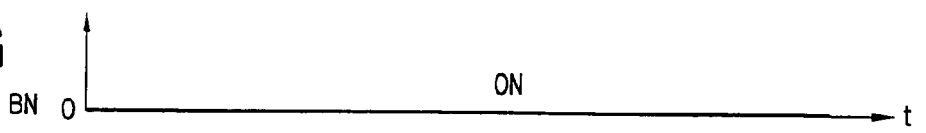

As shown in FIG. 5, the dead time generating part 34 comprises a plurality of resistors 34a, a plurality of condensers 34b and a plurality of NOT gates 34c. Further, with reference to FIG. 7A to 7E, the first switching signal $S_{abP}$, for which the logical value thereof is the same as that of the voltage compared signal $S_{ab}$, has a waveform having a dead time relative to the voltage compared signal $S_{ab}$ and of the second switching signal $S_{abN}$, and for which the logical value of the first switching signal $S_{abP}$ is opposite to that of the voltage compared signal $S_{ab}$, has a waveform having a dead time relative to the voltage compared signal $S_{ab}$.

The logical operation circuit part 35 outputs the switching control signals AP, BP, AN and BN to turn on and to turn off the respective switching units 11a, 11b, 21a and 21b of the first bridge 10 and of the second bridge 20 by logically calculating the control voltage sign signal Sign($V_{ab}$) outputted from the sign signal generating part 31, and the first switching signal $S_{abP}$ and the second switching signal $S_{abN}$ outputted from the dead time generating part 34. Further, the switching control signal AP is a control signal to turn on and to turn off the upper arm switching unit 21a of the second bridge 20, the switching control signal BP is a control signal to turn on and to turn off the upper arm switching unit 11a of the first bridge 10, the switching control signal AN is a control signal to turn on and to turn off the lower arm switching unit 21b of the second bridge 20, and the switching control signal BN is a control signal to turn on and to turn off the lower arm switching unit 11b of the first bridge 10.

FIG. 8 illustrates a table for logical expressions of the respective switching control signals AP, BP, AN, and BN. As shown in FIG. 8, the switching control signal AP is outputted as a logical sum of an inverse of a logical value of the control voltage sign signal Sign($V_{ab}$) and a logical value of the first switching signal $S_{abP}$, the switching control signal BP is outputted as a logical sum of the logical value of the control voltage sign signal Sign($V_{ab}$) and the logical value of the first switching signal $S_{abP}$, the switching control signal AN is outputted as a logical product of the logical value of the control voltage sign signal Sign($V_{ab}$) and a logical value of the second switching signal $S_{abN}$, and the switching control signal BN is outputted as a logical product of an inverse of the logical value of the control voltage sign signal Sign($V_{ab}$) and the logical value of the second switching signal $S_{abN}$. For example, when the logical value of the control voltage sign signal Sign($V_{ab}$) is "1", the switching control signals BP and BN have, respectively, logical values "1" and "0", the switching control signal AP has the same waveform as the first switching signal $S_{abP}$, and the switching control signal AN has the same waveform as the second switching signal $S_{abN}$ (refer to FIG. 7B to 7G). Further, when a logical value of the control voltage sign signal Sign($V_{ab}$) is "0", the switching control signals AP and AN have, respectively, logical values "1" and "0", the switching control signal BP has the same waveform as the first switching signal $S_{abP}$, and the switching control signal BN has the same waveform as the second switching signal $S_{abN}$.

The respective switching control signals AP, BP, AN and BN outputted from the logical operation circuit part 35 are inputted to the switching drivers 12a, 12b, 22a and 22b. The switching drivers 12a, 12b, 22a and 22b turn on and turn off the respective switching units 11a, 11b, 21a and 21b corresponding to the switching control signals AP, BP, AN and BN.

Hereinafter, with the above configuration, a control process for the power supply according to the embodiment of the present invention will be described.

While the control voltage signal $V_{ab}$ outputted from the control voltage signal generating part 40 is a positive value, the sign signal generating part 31 outputs a control voltage sign signal Sign($V_{ab}$) having a logical value "1". Further, the comparison signal generating part 32 outputs the voltage compared signal $S_{ab}$ by comparing absolute values of the control voltage signal $V_{ab}$ and the comparison voltage signal $V_{TRI}$ (refer to FIG. 6D). The dead time generating part 34 of the switching control signal generating part 33 receives the voltage compared signal $S_{ab}$ from the comparison signal generating part 32 and outputs the first switching signal $S_{abP}$ and the second switching signal $S_{abN}$ (refer to FIGS. 7B AND 7C). Further, the logical operation circuit part 35 receives the control voltage sign signal Sign $V_{ab}$, the first switching signal $S_{abP}$ and the second switching signal $S_{abN}$ and outputs the switching control signals AP, BP, AN and BN having logical values as described above by logically calculating the control voltage sign signal Sign $V_{ab}$, the first switching signal $S_{abP}$ and the second switching signal $S_{abN}$ (refer to FIGS. 7D to 7G). The respective switching control signals AP, BP, AN and BN outputted from the logical operation circuit part 35 are inputted to the respective switching drivers 12a, 12b, 22a and 22b. The switching drivers 12a, 12b, 22a and 22b turn on and turn off the switching units 11a, 11b, 21a and 21b by outputting voltages corresponding to the inputted switching control signals AP, BP, AN and BN. Further, while the logical value of the control voltage sign signal Sign($V_{ab}$) is "1", the upper arm switching unit 11a of the first bridge 10 is turned off by the switching control signal BP having a logical value "1", and the lower arm switching unit 11b of the first bridge 10 is maintained on by the switching control signal BN having a logical value "0". Further, the upper arm switching unit 21a and the lower arm switching unit 21b of the second bridge 20 are inversely and alternately turned on and turned off, respectively, corresponding to the waveforms of the first switching signal $S_{abP}$ and the second switching signal $S_{abN}$, respectively, having a logical value opposite to each other. Thus, the inverting part 3 outputs a voltage alternately having "0" and a voltage $V_{PN}$ supplied from the rectifying circuit through the first and second tap nodes 14 and 24 of the first bridge 10 and of the second bridge 20.

Further, while the control voltage signal $V_{ab}$ outputted from the control voltage signal generating part 40 is the negative value, the sign signal generating part 31 outputs the control voltage sign signal Sign($V_{ab}$) having a logical value "0". Further, the comparison signal generating part 32 outputs the voltage-compared signal $S_{ab}$, and the dead time generating part 34 outputs the first switching signal $S_{abP}$ and the second switching signal $S_{abN}$. The logical operation circuit part 35 outputs the switching control signals AP, BP, AN and BN by logically calculating the control voltage sign signal Sign($V_{ab}$), the first switching signal $S_{abP}$, and the second switching signal $S_{abN}$. While the control voltage sign signal Sign($V_{ab}$) has a logical value "0", the upper arm switching unit 21a of the second bridge 20 is turned off by the switching control signal AP having a logical value "1", the lower arm switching unit 21b of the second bridge 20 is maintained on by the switching control signal AN having a logical value "0". Further, the upper arm switching unit 11a and the lower arm switching unit 11b of the first bridge 10 alternately turn on and turn off, respectively, corresponding to the waveforms of the first switching signal $S_{abP}$ and the second switching signal $S_{abN}$. Thus, the inverting part 3 outputs a voltage alternately having "0" and a voltage value which has a same absolute value but an opposite sign, compared with the voltage $V_{PN}$ supplied from the rectifying circuit through the first and second tap nodes 14 and 24 of the first bridge 10 and of the second bridge 20.

The sign signal generating part 31 is provided to output the control voltage sign signal Sign($V_{ab}$) having the logical value "1" when the control voltage signal $V_{ab}$ is the positive value, and to output the control voltage sign signal Sign($V_{ab}$) having the logical value "0" when the control voltage signal $V_{ab}$ is the negative value. However, the sign signal generating part 31 may be provided to output the control voltage sign signal Sign($V_{ab}$) having an opposite logical value. While the control voltage signal $V_{ab}$ is the positive value, the lower arm switching unit 21b of the second bridge 20 is turned on, the upper arm switching unit 21a of the second bridge 20 is maintained off, and the upper and low arm switching units 11a and 11b of the first bridge 10 are alternately turned on and turned off.

While output power is supplied to the load 1, the power supply determines a magnitude and a sign of the control voltage signal $V_{ab}$ controlling the output power, maintains the switching units of one of the first bridge 10 and of the second bridge 20, respectively, to be on and off, and alternately turns on and turns off the switching units of the remaining one of the first bridge 10 and the second bridge 20 according to the positive and negative signs of the control voltage signal $V_{ab}$. Thus, a switching method reduces a number of the switching times approximately in half compared with a conventional switching method, to enable a reduction in power loss.

Further, as the number of the switching times is reduced, a size of the heat sink cooling the switching units 11a, 11b, 21a and 21b is reduced. Accordingly, cost is reduced and control efficiency is improved.

As described above, a power supply and a control method thereof capable of reducing power loss and a cost of the power supply, and of improving a control efficiency by reducing the number of switching times of an inverting part is provided.

Although an embodiment of the present invention has been shown and described, it will be appreciated by those skilled in the art that changes may be made in the embodiment without departing from the principles and spirit of the invention, the scope of which is defined in the appended claims and their equivalents.

What is claimed is:

1. A power supply having a rectifying circuit rectifying AC power; an inverting part inverting the power rectified by the rectifying circuit to the inverted AC power and supplying the inverted AC power to a load, and including a first bridge and a second bridge connected to opposite ends of the rectifying circuit and having respective pairs of switching units serially connected to each other, the power supply comprising:

a control voltage signal generating part outputting a control voltage signal having alternating values corresponding to positive and negative values to control the AC power supplied from the inverting part to the load; and a switching controller determining a sign of the control voltage signal, when the control voltage signal is determined to correspond to the positive values, and controlling one of the switching units of the first bridge to turn off and a remaining one of the switching units of the first bridge to turn on, and the switching units of the second bridge to alternately turn on and turn off corresponding to which one of an absolute value of the control voltage signal and of an absolute value of a predetermined comparison voltage signal is greater.

2. The power supply according to claim 1, wherein the switching controller controls, when the control voltage signal is determined to correspond to the negative values, the one of the switching units of the second bridge to be off and the remaining one of the switching units of the second bridge to be on, and the switching units of the first bridge to alternately turn on and turn off corresponding to which one of the absolute value of the control voltage signal and an absolute value of the predetermined comparison voltage signal is greater.

3. The power supply according to claim 1, wherein the switching controller comprises:

a comparison signal generating part outputting a voltage compared signal having a logical value corresponding to a determination result by determining which one of absolute values of the control voltage signal and the predetermined comparison voltage signal is greater;

a sign signal generating part outputting a control voltage sign signal having a logical value corresponding to positive and negative signs of the control voltage signal; and a switching control signal generating part logically calculating the voltage compared signal and the control voltage sign signal and outputting switching control signals to turn on and turn off the respective switching units of the first bridge and of the second bridge.

4. The power supply according to claim 3, wherein the switching control signal generating part comprises:

a dead time generating part receiving the voltage compared signal and outputting a first switching signal and a second switching signal having a dead time relative to the voltage compared signal; and a logical operation circuit part logically calculating the control voltage sign signal, the first switching signal and the second switching signal and outputting the switching control signals.

5. The power supply according to claim 4, wherein the first switching signal and the second switching signal outputted from the dead time generating part have logical values opposite to each other.

6. The power supply according to claim 5, wherein the sign signal generating part outputs the control voltage sign signal having a first logical value when the control voltage signal correspond to the positive values, and outputs a control voltage sign signal having a second logical value when the control voltage signal corresponds to the negative values.

7. The power supply according to claim 6, wherein respective ones of the switching units of the first bridge and of the second bridge are provided as upper arm switching units connected to a voltage output end of the rectifying circuit and as lower arm switching units connected to a voltage input end of the rectifying circuit, and the logical operation circuit part outputs the switching control signals allowing the lower arm switching unit of the first bridge to turn on, the upper arm switching unit of the first bridge to turn off, the upper arm switching unit of the second bridge to turn on and turn off corresponding to the first switching signal, and the lower arm switching unit of the second bridge to turn on and turn off corresponding to the second switching signal, while the control voltage sign signal is at the first logical value.

8. The power supply according to claim 7, wherein the logical operation circuit part outputs the switching control signals allowing the lower arm switching unit of the second bridge to turn on, the upper arm switching unit of the second bridge to turn off, the upper arm switching unit of the first bridge to turn on and turn off corresponding to the first switching signal, and the lower arm switching unit of the first bridge to turn on and turn off corresponding to the second switching signal, while the control voltage sign signal is at the second logical value.

9. The power supply according to claim 2, wherein the switching controller comprises:

a comparison signal generating part outputting a voltage compared signal having a logical value corresponding to a determination result by determining which one of absolute values of the control voltage signal and the comparison voltage signal is greater;

a sign signal generating part outputting a control voltage sign signal having a logical value corresponding to positive and negative signs of the control voltage signal; and a switching control signal generating part outputting switching control signals to turn on and turn off respective ones of the switching units of the first bridge and of the second bridge by logically calculating the voltage compared signal and the control voltage sign signal.

10. The power supply according to claim 9, wherein the switching control signal generating part comprises:

a dead time generating part receiving the voltage compared signal and outputting a first switching signal and a second switching signal having a dead time relative to the voltage compared signal; and a logical operation circuit part logically calculating the control voltage sign signal, the first switching signal and the second switching signal and outputting the switching control signals.

11. The power supply according to claim 10, wherein the first switching signal and the second switching signal outputted from the dead time generating part have logical values opposite to each other.

12. The power supply according to claim 11, wherein the sign signal generating part outputs the control voltage sign signal having a first logical value when the control voltage signal correspond to the positive values, and outputs the control voltage sign signal having a second logical value when the control voltage signal corresponds to the negative values.

13. The power supply according to claim 12, wherein respective ones of switching units of the first bridge and of the second bridge are provided as upper arm switching units connected to a voltage output end of the rectifying circuit and as lower arm switching units connected to a voltage input end of the rectifying circuit, and the logical operation circuit part outputs the switching control signals allowing the lower arm switching unit of the first bridge to turn on, the upper arm switching unit of the first bridge to turn off, the upper arm switching unit of the second bridge to turn on and turn off corresponding to the first switching signal, and the lower arm switching unit of the second bridge to turn on and turn off corresponding to the second switching signal, while the control voltage sign signal is at the first logical value.

14. The power supply according to claim 13, wherein the logical operation circuit part outputs the switching control signals allowing the lower arm switching unit of the second bridge to turn on, the upper arm switching unit of the second bridge to turn off, the upper arm switching unit of the first bridge to turn on and turn off corresponding to the first switching signal, and the lower arm switching unit of the first bridge to turn on and turn off corresponding to the second switching signal, while the control voltage sign signal is at the second logical value.

15. A control method of a power supply having a rectifying circuit rectifying AC power; an inverting part inverting the power rectified by the rectifying circuit to an inverted AC power and supplying the inverted AC power to a load, and comprising a first bridge and a second bridge connected to opposite ends of the rectifying circuit and having respective pairs of switching units serially connected to each other, the method comprising:

generating a control voltage signal having alternating values corresponding to negative and positive values to control the AC power supplied from the inverting part to the load;

determining whether the control voltage signal corresponds to the positive values or the negative values;

outputting a voltage compared signal having a logical value corresponding to which one of absolute values of the control voltage signal and a predetermined comparison voltage signal is greater; and controlling one of the switching units of the first bridge to turn on, a remaining one of the switching units of the first bridge to turn off, and the switching units of the second bridge to alternately turn on and turn off corresponding to the voltage compared signal when the control voltage signal is determined to correspond to the positive values.

16. The control method of the power supply according to claim 15, further comprising:

controlling one of the switching units of the second bridge to turn off, the remaining one of the switching units of the second bridge to turn on, and the switching units of the first bridge to alternatively turn on and turn off corresponding to the voltage compared signal when the control voltage signal is determined to correspond to the negative values.

17. A power supply having a rectifying circuit rectifying AC power including first and second bridges connected in parallel to opposite ends of the rectifying circuit and each having a pair of switching units serially connected to each other, comprising:

a switching controller controlling a switching sequence of the switching units corresponding to which one of an absolute value of a control signal and of an absolute value of a predetermined comparison signal is greater, when the control signal is determined to correspond to positive values, by switching off one of the switching units of the first bridge and switching on a remaining one of the switching units of the first bridge, and by alternately switching on and switching off the switching units of the second bridge.

18. The power supply according to claim 17, wherein, when the control signal is determined to correspond to negative values, the switching controller controls the one switching unit of the second bridge to be off and the remaining switching unit of the second bridge to be on, and alternately switches on and switches off the switching units of the first bridge corresponding to which one of the absolute values of the control signal and of the predetermined comparison signal is greater.

19. The power supply according to claim 17, wherein the switching controller comprises:

a signal generating part outputting a compared signal having a logical value corresponding to a result of determining which one of the absolute values of the control signal and the predetermined comparison signal is greater;

a sign signal generating part outputting a sign signal having a logical value corresponding to positive and negative signs in accordance with the positive and negative values of the control signal; and a switching signal generating part calculating the compared signal and the sign signal and outputting switching control signals to turn on and turn off the respective switching units of the first and second bridges.

20. The power supply according to claim 19, wherein the switching signal generating part comprises:

a dead time generating part receiving the compared signal and outputting first and second switching signals having a dead time relative to the compared signal; and a logic part calculating the sign signal, the first switching signal and the second switching signal and outputting the switching control signals.

21. The power supply according to claim 20, wherein the first and second switching signals outputted from the dead time generating part have logical values opposite to each other.

22. The power supply according to claim 21, wherein the sign signal has a first logical value when the control signal corresponds to the positive values, and a second logical value when the control signal corresponds to the negative values.

23. The power supply according to claim 22, wherein respective ones of the switching units of the first and second bridges are provided as upper arm switching units connected to an output end of the rectifying circuit and as lower arm switching units connected to an input end of the rectifying circuit, and the logic part outputs the switching control signals to switch on the lower arm switching unit of the first bridge, to switch off the upper arm switching unit of the first bridge, to switch on and switch off the upper arm switching unit of the second bridge corresponding to the first switching signal, and to switch on and switch off the lower arm switching unit of the second bridge corresponding to the second switching signal, while the sign signal is at the first logical value.

24. The power supply according to claim 23, wherein the logic part outputs the switching control signals to switch on the lower arm switching unit of the second bridge, to switch off the upper arm switching unit of the second bridge, to switch on and switch off the upper arm switching unit of the first bridge corresponding to the first switching signal, and to switch on and switch off the lower arm switching unit of the first bridge corresponding to the second switching signal, while the sign signal is at the second logical value.

25. The power supply according to claim 18, wherein the switching controller comprises:

a signal generating part outputting a compared signal having a logical value corresponding to a result of determining which one of the absolute values of the control signal and the predetermined comparison signal is greater;

a sign signal generating part outputting a sign signal having a logical value corresponding to positive and negative signs in accordance with the positive and negative values of the control signal; and a switching signal generating part outputting switching control signals to turn on and turn off respective ones of the switching units of the first and second bridges by calculating the compared signal and the sign signal.

26. The power supply according to claim 25, wherein the switching signal generating part comprises:

a dead time generating part receiving the compared signal and outputting first and second switching signals having a dead time relative to the compared signal; and a logic part calculating the sign signal, the first switching signal and the second switching signal and outputting the switching control signals.

27. The power supply according to claim 26, wherein the first and second switching signals outputted from the dead time generating part have logical values opposite to each other.

28. The power supply according to claim 27, wherein the sign signal has a first logical value when the control signal corresponds to the positive values, and a second logical value when the control signal corresponds to the negative values.

29. The power supply according to claim 28, wherein respective ones of switching units of the first and second bridges are provided as upper arm switching units connected to an output end of the rectifying circuit and as lower arm switching units connected to an input end of the rectifying circuit, and the logic part outputs the switching control signals to switch on the lower arm switching unit of the first bridge, to switch off the upper arm switching unit of the first bridge, to switch on and to switch off the upper arm switching unit of the second bridge corresponding to the first switching signal, and to switch on and to switch off the lower arm switching unit of the second bridge corresponding to the second switching signal, while the sign signal is at the first logical value.

30. The power supply according to claim 29, wherein the logic part outputs the switching control signals to switch on the lower arm switching unit of the second bridge, to switch off the upper arm switching unit of the second bridge, to switch on and to switch off the upper arm switching unit of the first bridge corresponding to the first switching signal, and to switch on and to switch off the lower arm switching unit of the first bridge corresponding to the second switching signal, while the sign signal is at the second logical value.

31. The power supply according to claim 17, wherein each of the switching units is a transistor.

32. The power supply according to claim 24, wherein the switching controller outputs the switching control signals to respective ones of the switching units such that a first switching control signal outputted to the upper arm switching unit of the second bridge is a logical sum of an inverse of a logical value of the sign signal and a logical value of the first switching signal, a second switching control signal outputted to the lower arm switching unit of the second bridge is a logical sum of the logical value of the sign signal and the logical value of the first switching signal, a third switching control signal outputted to the upper arm switching unit of the first bridge is a logical product of the logical value of the sign signal and a logical value of the second switching signal, and the fourth switching control signal outputted to the lower arm switching unit of the first bridge is a logical product of an inverse of the logical value of the sign signal and the logical value of the second switching signal.

33. A control method of a power supply having a rectifying circuit rectifying AC power including first and second bridges connected in parallel to opposite ends of the rectifying circuit and each having a pair of switching units serially connected to each other, comprising:

generating a control signal having values corresponding to positive and negative values to control the power supplied to a load;

determining whether the control signal corresponds to the positive values or the negative values;

outputting a compared signal having a logical value corresponding to which one of absolute values of the control signal and a comparison signal is greater; and controlling one of the switching units of the first bridge to switch on, a remaining one of the switching units of the first bridge to switch off, and the switching units of the second bridge to alternately switch on and switch off corresponding to the compared signal when the control signal is determined to correspond to the positive values.

34. The control method of the power supply according to claim 33, further comprising:

controlling the one switching unit of the second bridge to switch off, the remaining switching unit of the second bridge to switch on, and the switching units of the first bridge to alternately switch on and switch off corresponding to the compared signal when the control signal is determined to correspond to the negative values.

35. A control method of a power supply having a rectifying circuit rectifying AC power including first and second bridges connected in parallel to opposite ends of the rectifying circuit and each having a pair of switching units serially connected to each other, comprising:

determining whether the control signal corresponds to positive values or negative values;

outputting a compared signal having a logical value corresponding to which one of absolute values of the control signal and of a predetermined comparison signal is greater; and controlling a switching sequence of the switching units corresponding to which one of an absolute values of a control signal and of the predetermined comparison signal is greater such that, when the control signal is determined to correspond to the positive values, switching off one of the switching units of the first bridge and switching on a remaining one of the switching units of the first bridge, and alternately switching on the switching units of the second bridge and, when the control signal is determined to correspond to the negative values, the one switching unit of the second bridge being off and the remaining switching unit of the second bridge being on, and alternately switching on and switching off the switching units of the first bridge.

36. A power supply having a rectifying circuit rectifying AC power including a first bridge and a second bridge connected to opposite ends of the rectifying circuit and having respective pairs of switching units serially connected to each other, comprising:

a signal generating part outputting a signal having values corresponding to positive and negative values to control the power supply; and a switching controller, when the signal is determined to correspond to the positive values, controlling one of the switching units of the first bridge to turn off and a remaining one of the switching units of the first bridge to turn on, and controlling one of the switching units of the second bridge to turn on and a remaining one of the switching units of the second bridge to turn off corresponding to which one of absolute values of the signal and of a predetermined comparison signal is greater.

* * * * *